2,925,389

FERROMAGNETIC CORES AND METHOD

Cornelis Jacobus Esveldt and Evert Willem Gorter, Emmasingel, Eindhoven, Netherlands, assignors, by mesne assignments, to North American Philips Company, Inc., New York, N.Y., a corporation of Delaware Application December 20, 1954, Serial No. 476,530

4 Claims. (Cl. 252—62.5)

Magnetic cores having a nearly rectangular hysteresis loop are of importance for a variety of uses. Cores of this kind are used inter alia for so-called "magnetic memories" (see for example W. N. Papian, Proceedings of the I.R.E., April 1952, pages 475 to 478, and D. R. Brown and E. Albers-Schoenberg, "Electronics," April 1953, pages 146 to 149). Such magnetic memories are used inter alia in calculating machines and automatic pilots. An an alternative, these cores are used in magnetic switches.

The extent to which the shape of the hysteresis loop approaches to rectangularity can be quantitatively expressed in various manners. A usual measure is, for example, the quotient $$\frac{B_r}{B_{cl}}$$

Figure 1:
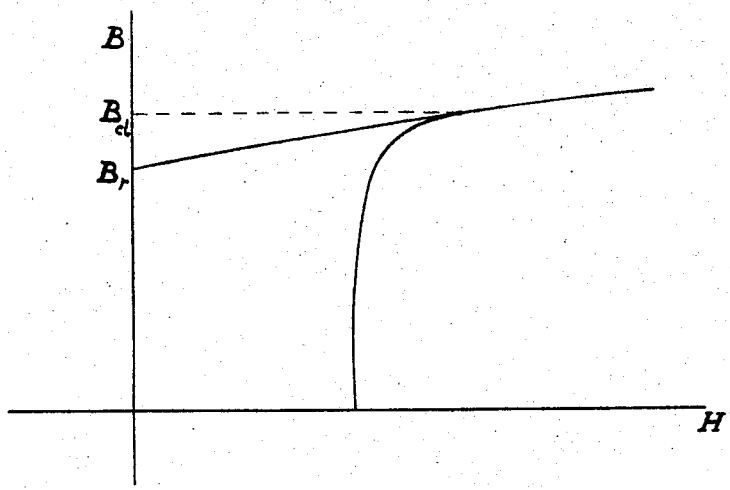

In explanation of the signification of the said quotient we refer to Fig. 1, which is a diagram of part of a saturation magnetisation curve. In this figure $B_r$ represents the remanent induction whilst $B_{cl}$ represents that induction at which the hysteresis loop is precisely closed. In practice it frequently is difficult to measure $B_{cl}$ with a high degree of accuracy. However, an approximately correct value of $B_{cl}$ is readily found by taking the mean value of the inductions after partial magnetisation and partial demagnetisation respectively (with intervening saturation), both inductions being measured at the same field strength such that the said inductions are distinguished from one another by more than 1% but less than 3%. This method was used in carrying out the measurements made in establishing the present invention; for these measurements use was made of a ballistic galvanometer (see Bozorth, "Ferromagnetism," page 843). When the quotient $$\frac{B_r}{B_{cl}}$$

is referred to, this invariably assumed to have been ascertained by measurement of an annular magnetic code of constant cross-section of the ferromagnetic material throughout the circumference of the ring and having an external diameter which at a maximum is 1.6 times the internal diameter.

Figure 2:
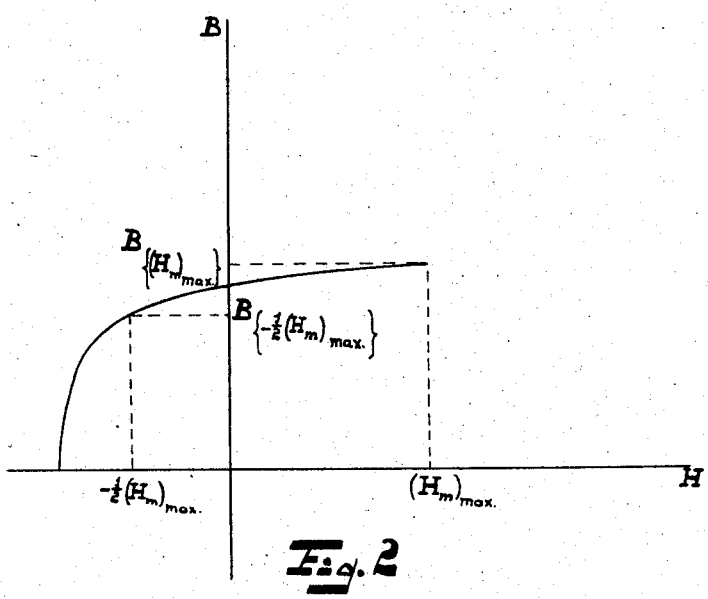

The extent to which the shape of the hysteresis loop approaches to rectangularity may also be expressed by means of the so-called "squareness ratio" $(R_s)_{max}$. For the meaning of this quantity we refer to the above-mentioned literature. For the sake of completeness a short explanation follows with reference to Fig. 2 which is also a diagram of part of a magnetisation curve relating to a case where demagnetisation was started before magnetic saturation was reached. The quantity $(R_s)_{max}$ is defined as $$\left\{ \frac{B_{(-\frac{1}{2}H_m)}}{B_{(H_m)}} \right\}_{max}$$

The quotient $$\frac{B_{(-1/2H_m)}}{B_{(H_m)}}$$

is a function of the applied maximum field strength $H_m$. It has been found that this quotient has a maximum at a definite value of $H_m$ which usually is only slightly different from the coercive force $H_c$. This maximum value of the quotient is indicated by the symbol $(R_s)_{max}$. The measurements of $B_{(H_m)}$ and $B_{(-1/2H_m)}$ required to ascertain $(R_s)_{max}$ can again be effected with the aid of a ballistic galvanometer. Here also as measuring objects use is made of annular magnetic cores of constant cross-section of the magnetic material throughout the circumference of the ring and having an external diameter which at a maximum is 1.6 times the internal diameter. When using ferromagnetic materials having a nearly rectangular hysteresis loop high frequency alternating currents are usually concerned and consequently it is of importance to reduce the occurrence of eddy currents to a minimum. When ferromagnetic alloys are used this may be effected to a certain extent by building up the magnetic core from very thin layers of the magnetic material insulated from one another. However in many cases it is very difficult to build up cores having a nearly rectangular hysteresis loop from these thin layers. Consequently, at these high frequencies it is of advantage and at even higher frequencies it is necessary to use magnetically soft ferric oxide containing materials of spinel structure, for these materials already have a very slight electric conductivity per se.

For the usability of the magnetic cores concerned as magnetic memories and magnetic switches it is also essential that the coercive force is small (preferably not more than 10 oersted and even lower than 5 oersted) since otherwise the electromagnetic losses are excessive.

According to the invention it has been found that magnetic cores having a nearly rectangular hysteresis loop such that the condition $$\frac{B_r}{B_{sl}} > 0.7 \text{ and/or } (R_s)_{max} > 0.6$$

is satisfied, $H_c$ being less than 4 oersted, are obtainable by manufacturing them from a material which at least substantially consists of at least one compound of the formula $Ni_xMg_{(1-x)}Fe_2O_4$ where $x=0.2-0.9$, which compounds are produced by heating a mixture of compounds of nickel, of magnesium and of iron in the desired weight ratio to a temperature of from 1375 to 1475° C. in a gas atmosphere with a proportion of oxygen exceeding 50 percent by volume.

It is possible to replace a small part of the nickel or magnesium respectively by zinc in the compounds of the said composition in so far as they have a comparatively high content of nickel as compared with the magnesium content while maintaining the above-described favourable properties. The compounds thus obtained may be represented by the formula:

$$Ni_xMg_{(1-x-y)}Zn_yFe_2O_4$$

where $x=0.6-0.8$, $y=0.1-0.3$, $x+y=0.7-0.9$.

The compounds containing zinc (which are produced in a manner exactly analogous to that described with respect to those containing no zinc are distinguished from those containing no zinc by a considerably smaller coercive force. As is well known, a small coercive force is of advantage in the uses concerned since it results in a saving in electric energy.

Example

A mixture of magnesium carbonate, nickel carbonate, iron oxide and, as the case may be, zinc oxide is ground for from eight to ten hours in absolute alcohol or anhydrous benzene and subsequently pre-fired at 900° C. in air for one hour. After cooling the reaction product is again ground in absolute alcohol for a period of time of, say, 2 hours. Thereupon it is compressed to form a ring and this ring is heated at approximately 1450° C. in oxygen.

The subjoined table provides a survey of the values of the quotient $$\frac{B_r}{B_{cl}}$$

of the squareness ratio $(R_s)_{max}$ and of the coercive force $H_c$ of the magnetic cores having a composition coming within the scope of the present invention.

| Composition | | | | $\frac{B_r}{B_{cl}}$ | $(R_s)_{max}$ | $H_c$ (in Oersted) |
|---|---|---|---|---|---|---|
| Ni$_{0.5}$ | Mg$_{0.5}$ | Fe$_2$O$_4$ | | 0.65–0.70 | 0.8 | 3.0 |
| Ni$_{0.6}$ | Mg$_{0.4}$ | Fe$_2$O$_4$ | | 0.70 | 0.8 | 2.95 |
| Ni$_{0.4}$ | Mg$_{0.6}$ | Fe$_2$O$_4$ | | 0.75 | 0.81 | 3.25 |
| Ni$_{0.2}$ | Mg$_{0.8}$ | Fe$_2$O$_4$ | | 0.65 | 0.75 | 3.75 |
| Ni$_{0.7}$ | Mg$_{0.2}$ | Zn$_{0.1}$ | Fe$_2$O$_4$ | 0.65 | 0.8 | 2.2 |
| Ni$_{0.7}$ | Mg$_{0.1}$ | Zn$_{0.2}$ | Fe$_2$O$_4$ | 0.70 | 0.75 | 2.0 |

What is claimed is:

1. A method of manufacturing a ferromagnetic ferrite having a substantially square hysteresis loop comprising the steps, forming a finely-divided mixture of nickel, magnesium and iron oxides in proportions corresponding to a composition having the formula: $Ni_xMg_{(1-x)}Fe_2O_4$, in which $x$ is between about 0.2 and 0.8, and heating said mixture of oxides at a temperature of about 1375° to 1475° C. in an atmosphere containing more than 50% by volume of oxygen to form a ferromagnetic ferrite having said composition, said ferrite having a coercive force ($H_c$) less than 4 oersted and fulfilling at least one of the following conditions:

(a) $B_r/B_{cl}$ not less than 0.7,
   (b) $(R_s)_{max}$ not less than 0.6.

2. A method of manufacturing a ferromagnetic ferrite having a substantially square hysteresis loop comprising the steps, forming a finely-divided mixture of nickel, magnesium, zinc, and iron oxides in proportion corresponding to a composition having the formula:

$$Ni_xMg_{(1-x-y)}Zn_yFe_2O_4$$

in which $x$ is between about 0.6 and 0.8, $y$ is between about 0.1 and 0.3 and $x+y$ is between about 0.7 and 0.9, and heating said mixture of oxides to a temperature of about 1375° to 1475° C. in an atmosphere containing more than 50% by volume of oxygen to form a ferrite having said composition, said ferrite having a coercive force ($H_c$) less than 4 oersted and fulfilling at least one of the following conditions:

(a) $B_r/B_{cl}$ not less than 0.7,
   (b) $(R_s)_{max}$ not less than 0.6.

3. A ferromagnetic ferrite having a substantially square hysteresis loop formed by firing at a temperature of about 1375° to 1475° C. in an atmosphere containing more than 50% by volume of oxygen a finely-divided mixture of nickel, magnesium and iron oxides in proportions corresponding to the formula: $Ni_xMg_{(1-x)}Fe_2O_4$, in which $x$ is between about 0.2 and 0.8, said ferrite having a coercive force ($H_c$) less than 4 oersted and fulfilling at least one of the following conditions:

(a) $B_r/B_{cl}$ not less than 0.7,
   (b) $(R_s)_{max}$ not less than 0.6.

4. A ferromagnetic ferrite having a substantially square hysteresis loop formed by firing at a temperature of about 1375° C. to 1475° C. in an atmosphere containing more than 50% by volume of oxygen a finely-divided mixture of nickel, magnesium, zinc and iron oxides in proportions corresponding to the formula:

$$Ni_xMg_{(1-x-y)}Zn_yFe_2O_4$$

in which $x$ is between about 0.6 and 0.8, $y$ is between 0.1 and 0.3, and $x+y$ is between 0.7 and 0.9, said ferrite having a coercive force ($H_c$) of not more than 4 oersted and fulfilling at least one of the following conditions:

(a) $B_r/B_{cl}$ not less than 0.7,
   (b) $(R_s)_{max}$ not less than 0.6.

References Cited in the file of this patent

UNITED STATES PATENTS

| 2,565,861 | Leverenz et al. | Aug. 28, 1951 |
| 2,568,881 | Albers-Schoenberg | Sept. 25, 1951 |
| 2,586,018 | Friend | Feb. 19, 1952 |
| 2,723,239 | Harvey | Nov. 8, 1955 |

FOREIGN PATENTS

| 671,788 | Great Britain | May 7, 1950 |
| 697,219 | Great Britain | Sept. 16, 1953 |

OTHER REFERENCES

Philips Technical Review, vol. 16, No. 2, pages 49–58, August 1954.

J. of the Institute of Electrical Engineers, Japan, November 1957, p. 7; June 1939, p. 281.

Harvey et al.: R.C.A. Review, vol. XI, p. 346 (publications in Div. 64).

Physica, vol. 3, No. 6, June 1936, pages 481–482.

Comptes Rendus, Académie des Sciences, vol. 209 (1939), pages 164–167.

UNITED STATES PATENT OFFICE

CERTIFICATE OF CORRECTION

Patent No. 2,925,389            February 16, 1960

Cornelis Jacobus Esveldt et al.

It is hereby certified that error appears in the above numbered patent requiring correction and that the said Letters Patent should read as corrected below.

In the heading to the printed specification, between lines 7 and 8, insert -- Claims priority, application Netherlands December 21, 1953 --; column 1, line 23, for "An", first occurrence, read -- As --; line 54, for "code" read -- core --.

Signed and sealed this 4th day of October 1960.

(SEAL)

Attest:

KARL H. AXLINE
Attesting Officer

ROBERT C. WATSON
Commissioner of Patents